US012485427B2

(12) United States Patent
Jenne et al.

(10) Patent No.: US 12,485,427 B2
(45) Date of Patent: Dec. 2, 2025

(54) SWITCHABLE MAGNETIC FILTER

(71) Applicant: Taco, Inc., Cranston, RI (US)

(72) Inventors: Justin Jenne, Rochester, MA (US); Edward Dion, Jr., Dartmouth, MA (US); Robert Sampson, Fall River, MA (US); Ronnie Falcon, Fall River, MA (US)

(73) Assignee: TACO, INC., Cranston, RI (US)

( * ) Notice: Subject to any disclaimer, the term of this patent is extended or adjusted under 35 U.S.C. 154(b) by 313 days.

(21) Appl. No.: 18/102,634

(22) Filed: Jan. 27, 2023

(65) Prior Publication Data

US 2023/0241625 A1 Aug. 3, 2023

Related U.S. Application Data

(60) Provisional application No. 63/304,128, filed on Jan. 28, 2022.

(51) Int. Cl.
*B03C 1/28* (2006.01)
*H01F 7/04* (2006.01)

(52) U.S. Cl.
CPC .............. *B03C 1/284* (2013.01); *B03C 1/286* (2013.01); *H01F 7/04* (2013.01); *B03C 2201/18* (2013.01); *B03C 2201/22* (2013.01)

(58) Field of Classification Search
CPC ......... B03C 1/284; B03C 1/286; B03C 1/288; B03C 2201/18; B03C 2201/22; H01F 7/04
See application file for complete search history.

(56) References Cited

U.S. PATENT DOCUMENTS 4,664,796 A * 5/1987 Graham .................. B03C 1/288 210/408
2002/0105400 A1 8/2002 Underwood et al.
2011/0203976 A1 8/2011 Baker
2015/0068964 A1 3/2015 McAllorum et al.
2020/0047189 A1 2/2020 Mackenzie et al.

* cited by examiner

*Primary Examiner* — Liam Royce
(74) *Attorney, Agent, or Firm* — LOEB & LOEB LLP

(57) ABSTRACT

A switchable magnetic filter for collecting metallic particles in a fluid flowing through a vessel, comprising a handle for rotatably or slidingly engaging a magnetic assembly within a housing to an ON position to create a magnetic field outside of the housing to collect and retain metallic particles against the outer wall of the housing, and to an OFF position to shunt the magnetic field within the housing to release the metallic particles from the outer wall of the housing so they may be removed from the fluid for cleaning purposes.

5 Claims, 9 Drawing Sheets

LINEAR SHIFTING MAGNET INTERNALS

ON POSITION
702
704
706
710
712

CROSS SECTION
708
704
710
706

OFF POSITION
704
706
710
712

CROSS SECTION
708
712
704
710
706

LINEAR SHIFTING MAGNET PROBE

LINEAR SHIFTING MAGNET INTERNALS & PROBE

ON POSITION

OFF POSITION

SWITCHABLE MAGNETIC FILTER

TECHNICAL FIELD

The present invention relates generally to a switchable magnetic filter for integration within fluid pumping systems, in which the filter attracts suspended contaminants from the fluid being circulated for easy removal from the system.

BACKGROUND OF THE INVENTION

The current field of magnetic separators or magnetic filtration within fluid pumping systems only include mechanical magnets without the ability to selectively turn off the magnetic field for cleaning purposes. This invention allows the end user to selectively turn off and on the magnetic field generated within the system to release the particles or impurities for cleaning with a simple operation of a handle.

SUMMARY OF THE INVENTION

The present invention is a switchable magnetic filter that is housed within a fluid pumping system that allows the end user to operate a handle to selectively turn off a magnetic field to release metallic particles or impurities within the fluid being circulated for easy removal, and then move the handle to turn the magnetic field back on to continue collecting the magnetic particles during operation of the pumping system. This eliminates the need for tools or complex procedures of removing the magnets and/or probes. This switchable magnet filter will be placed in a canister or vessel that contains a drain or relief to release the particles. During operation, the magnetic field will be switched on in order to attract and collect the metallic impurities flowing in the fluid. When (periodic) cleaning is required (i.e., removal of the metallic particles from the filter), a simple procedure will be implemented by the end user to stop active flow of the fluid in the system, switch off the magnetic field, and open the drain/relief to release the unwanted impurities. To put back in service, the end user will close the drain/relief, switch on the magnetic field, and allow for standard operation flow to return.

Embodiments described more particularly herein include a rotatable probe in which the operator rotates the probe within a housing to selectively turn the magnetic field on or off, as desired, as well as linear shifted probe in which the operator slides the probe linearly back and forth within a housing to selectively turn the magnetic field on or off, as desired.

In particular, described herein is a switchable magnetic filter for collecting metallic particles in a fluid flowing through a vessel, comprising a housing assembly comprising a flange for mounting the housing assembly to a vessel, and a probe housing formed from a pair of linearly extending magnetic portions separated by a pair of linearly extending non-magnetic portions; and a magnetic probe comprising a shaft having a handle connected at a first end and a magnetic assembly at a second end, the magnetic assembly comprising a pair of oppositely disposed substantially semi-cylindrical magnetic portions comprising a north magnet and a south magnet; the magnetic probe inserted within the housing assembly such that the handle may be rotated to an ON position in which in which the north magnet and the south magnet are positioned such that the resulting north-south magnetic field flows outside of the housing and into fluid within the vessel surrounding the outside of the housing, thus attracting the magnetic impurities in the fluid and retaining them against the outer wall of the housing, and an OFF position in which in which the north magnet and the south magnet are positioned such that the resulting north-south magnetic field flows through the magnetic portions and is shunted within the probe housing whereby magnetic impurities previously retained against an outer wall of the housing are released.

Also described is a second embodiment switchable magnetic filter for collecting metallic particles in a fluid flowing through a vessel, comprising a housing assembly comprising a flange for mounting the housing assembly to a vessel, and a probe housing; and a magnetic probe comprising a shaft assembly comprising two independently rotatable shaft portions, the shaft assembly having a handle connected at one end and a magnetic assembly at a second end, the magnetic assembly comprising a pair of diametrically magnetized cylindrical magnets located on the shaft assembly, each of the pair of diametrically magnetized cylindrical magnets comprising a south polarized magnet and a north polarized magnet; the magnetic probe inserted within the housing assembly such that the handle may be turned to an ON position in which the magnetic assembly is positioned such that the resulting north-south magnetic field flows outside of the housing and into fluid within the vessel surrounding the outside of the housing, thus attracting the magnetic impurities in the fluid and retaining them against the outer wall of the housing, and an OFF position in which in which the magnetic assembly is positioned such that the resulting north-south magnetic field flows through the magnetic portions and is shunted within the probe housing whereby magnetic impurities previously retained against an outer wall of the housing are released.

Also described is a third embodiment switchable magnetic filter for collecting metallic particles in a fluid flowing through a vessel, comprising a housing assembly comprising a flange for mounting the housing assembly to a vessel, and a probe housing; and a magnetic probe comprising a shaft assembly having a handle connected at one end and a plurality of magnetic assemblies located along the shaft, including alternating north and south polarized magnets; the magnetic probe inserted within the housing assembly such that an attached handle may be slid within the probe to an ON position in which in which the magnetic assembly is positioned such that the resulting north-south magnetic field flows outside of the housing and into fluid within the vessel surrounding the outside of the housing, thus attracting the magnetic impurities in the fluid and retaining them against the outer wall of the housing, and then slid to an OFF position in which in which the magnetic assembly is positioned such that the resulting north-south magnetic field flows through the magnetic portions and is shunted within the probe housing whereby magnetic impurities previously retained against an outer wall of the housing are released.

DETAILED DESCRIPTION OF THE INVENTION

A unique and novel feature of this invention is the introduction of switchable magnets, rotatable or slidable, to provide magnetic filtration. Switchable magnets can be accomplished in many physical ways. The key underlying technology is utilizing one or more magnets to alter a magnetic field from being formed internally within a housing that doesn't interact with its surrounding fluid, to switch to being formed externally outside the housing where the magnetic field is active within its surroundings to attract magnetic impurities from the surrounding fluid.

Aligned Magnetic Probe

Figure 3B:
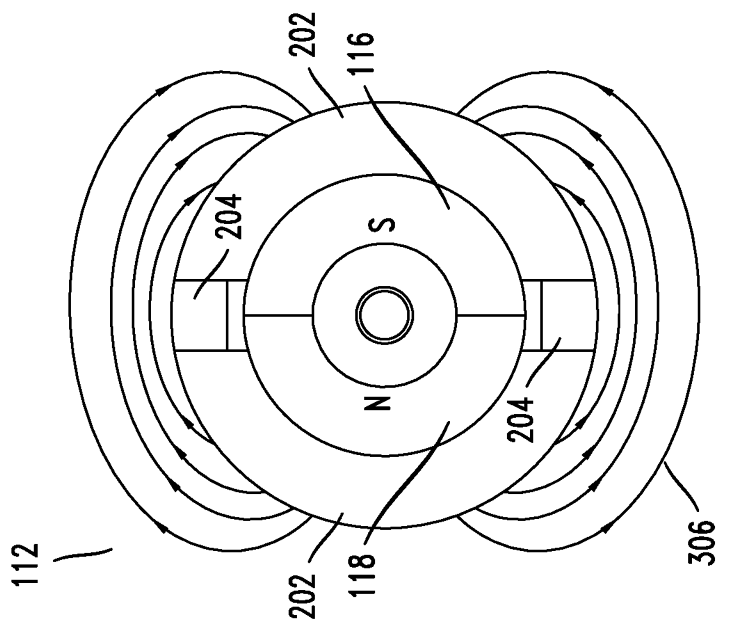
FIG. 3B is a cross section view of the rotatable magnetic probe of FIG. 1A rotated in the ON position as shown in FIG. 6A.
Figure 3A:
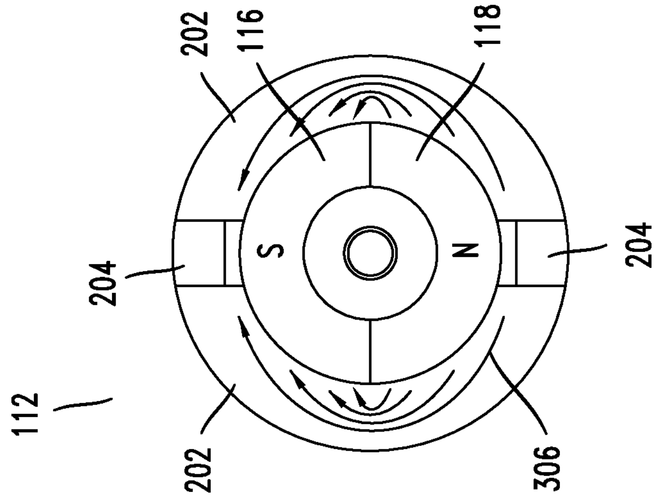
FIG. 3A is a cross section view of the rotatable magnetic probe of FIG. 1A rotated in the OFF position as shown in FIG. 6B and FIG. 6C.

In accordance with a first embodiment of the invention, one or more diametrically magnetized cylindrical magnets are located on a shaft to create the magnetic assembly. If more than one magnet is used in the magnetic assembly, all must have the poles of magnets aligned on the shaft. The probe consists of two types of materials; magnetic (e.g., carbon steel) and non-magnetic (e.g., stainless steel), or the geometry of a single material must be that to reduce the magnetic flux between poles while in the ON position. When rotated in the ON position as shown in FIG. 3B, the poles of the magnetic assembly are aligned with the magnetic material, creating external magnetic field lines for attracting the ferrous impurities within the fluid surrounding the probe housing. When rotated in the OFF position as shown in FIG. 3A, the poles of the magnet straddle the magnetic material, shunting the magnet field so that most if not of all the magnetic field remains inside the probe housing and not extend into the fluid. This will release the ferrous impurities when cleaning/removal is performed.

Figure 1A:
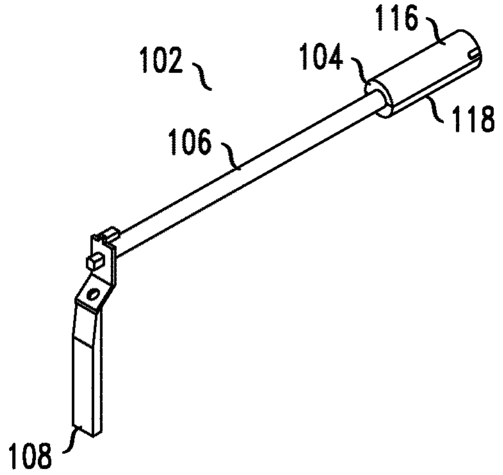
FIG. 1A is a perspective view of a rotatable magnetic probe in accordance with a first embodiment of the present invention.
Figure 1B:
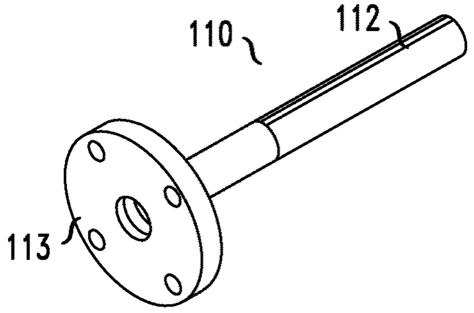
FIG. 1B is a perspective view of a housing assembly (including the probe housing of FIG. 2) used to hold the rotatable magnetic probe of FIG. 1A in accordance with the first embodiment of the present invention.
Figure 1C:
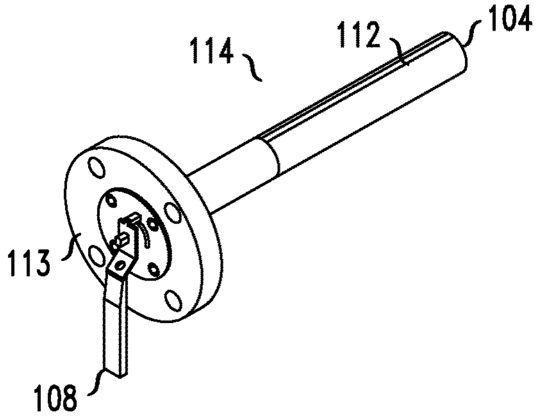
FIG. 1C is a perspective view of an assembled switchable magnetic filter in accordance with the first embodiment of the present invention.

FIG. 1A is a perspective view of a rotatable magnetic probe 102 in accordance with this first embodiment. The rotatable magnetic probe 102 is formed with a shaft 106 having a handle 108 at one end and a magnetic assembly 104 at the opposite end. The magnetic assembly 104 in this embodiment is comprised of a pair of oppositely disposed substantially semi-cylindrical magnetic portions (south polarized magnet 116 and north polarized magnet 118). FIG. 1B is a perspective view of a housing assembly 110 used to hold the rotatable magnetic probe 102 of FIG. 1A. The housing assembly 110 includes a flange 113 that will be used to mount the assembled filter 114 (see FIG. 1C) to a vessel 602 in which fluid is being pumped (see FIG. 6A). The housing assembly 110 also includes a probe housing 112 into which the rotatable magnetic probe 102 is inserted. FIG. 1C is a perspective view of the assembled switchable magnetic filter 114 in which the rotatable magnetic probe 102 of FIG. 1A has been inserted within the housing assembly 110 of FIG. 1B.

Figure 2:
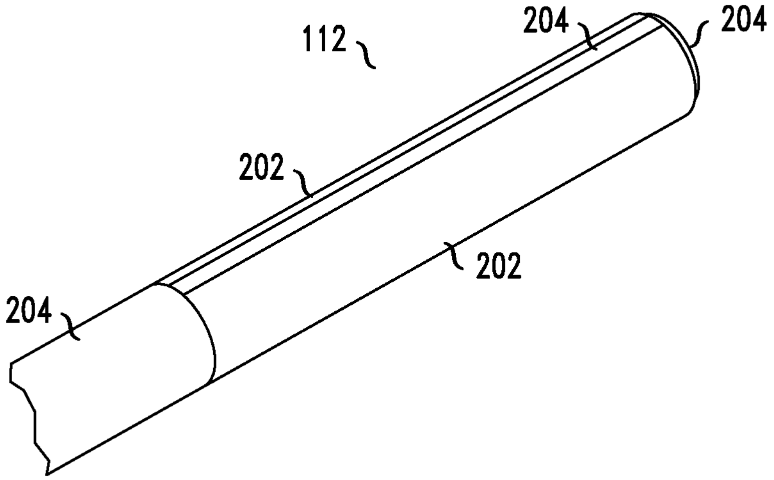
FIG. 2 is a closeup illustration of the probe housing of FIG. 1B and FIG. 1C in accordance with the first embodiment of the present invention.

FIG. 2 is a closeup illustration of the probe housing 112 of FIG. 1B. The probe housing 112 is assembled from a non-magnetic portion 204 (e.g., stainless steel), which forms an outer casing where shown, and which extends to divide a pair of oppositely disposed substantially semi-cylindrical magnetic portions 202 (e.g., carbon steel). FIG. 3A is a cross section view of the assembled filter 114 of FIG. 1C in the OFF position, in which the magnets 116, 118 are positioned such that the resulting north-south magnetic field 306 flows through the magnetic portions 202 and is essentially shunted within the probe housing 112 (thus releasing any magnetic impurities that may have been previously retained against the outer wall of the housing 112). FIG. 3B is a cross section view of the assembled magnetic probe in the ON position, which is attained by turning the handle 108 of the magnetic probe 102 by approximately 90 degrees so that the interface between the north and south poles is located near the non-magnetic extended portion 204. The resulting north-south magnetic field 306 is now interrupted and flows outside of the magnetic portions 202 and into the surrounding fluid outside of the housing 112 (thus attracting the magnetic impurities in the fluid and retaining them against the outer wall of the housing 112). These magnetic impurities (not shown) may be released and collected as desired by simply turning the handle back to the OFF position as in FIG. 3A when system cleaning is desired.

Opposing Magnets Probe

Figure 4A:
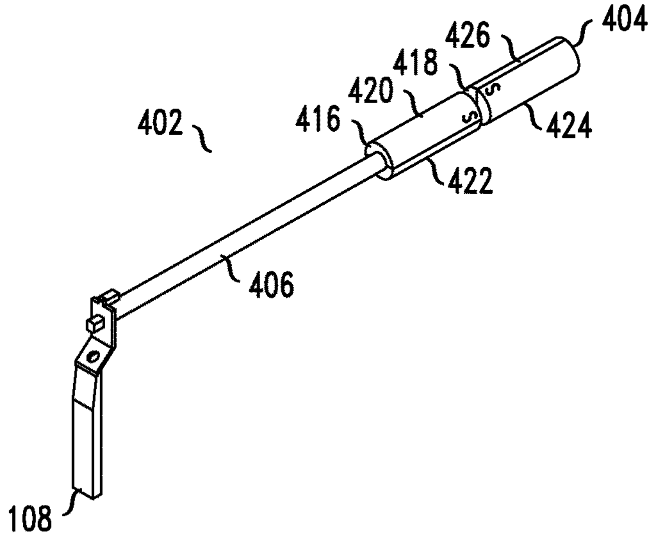
FIG. 4A is a perspective view of a rotatable magnetic probe in accordance with the second embodiment of the present invention.
Figure 4B:
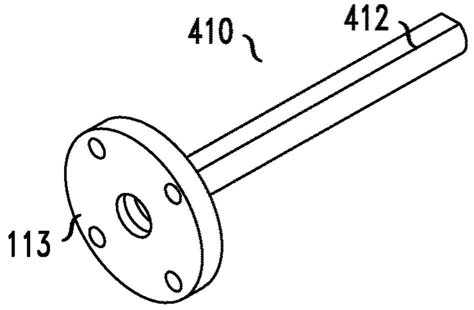
FIG. 4B is a perspective view of a housing assembly used to hold the rotatable magnetic probe of FIG. 4A in accordance with the second embodiment of the present invention.

FIG. 4A is a perspective view of a magnetic probe 402 in accordance with the second embodiment of the present invention that uses opposing magnets. Shown is a shaft assembly 406 with a handle 108 at one end and a magnetic assembly 404 at the other end. However, this magnetic assembly 404 is different from that of the first embodiment. Here, one or more diametrically magnetized cylindrical magnets 416, 418 are located on the shaft assembly 406 to create the magnetic assembly 404. The shaft assembly 406 comprises two independently rotatable shaft portions (not shown), wherein two sets of magnets 416, 418 are each located on the independently rotatable portions of the shaft assembly 406. Magnet 416 is comprised of south polarized magnet 420 and north polarized magnet 422, and the magnet 418 is comprised of south polarized magnet 424 and north polarized magnet 426. The magnetic force must be substantially equal on each shaft portion, and each shaft portion must contain at least one magnet (two total). As shown in FIG. 4B, the probe housing 412 consists of two types of materials, magnetic (e.g., carbon steel) and non-magnetic (e.g., stainless steel) or the geometry of a single material must be that to reduce the magnetic flux between poles while in the ON position. The quantity and geometry are directly linked to the number of poles of the magnetic assembly.

Figure 4C:
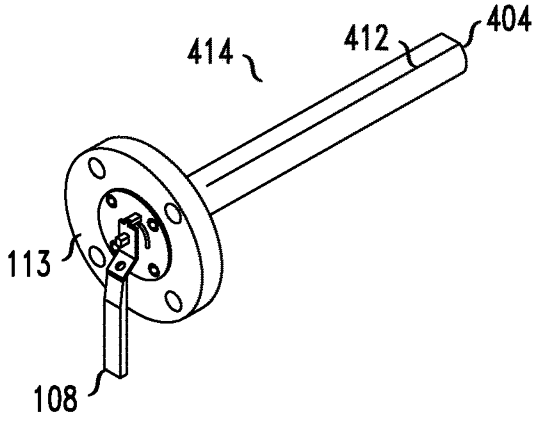
FIG. 4C is a perspective view of an assembled switchable magnetic filter in accordance with the second embodiment of the present invention.

FIG. 4B is a perspective view of a housing assembly 410 used to hold the magnetic probe 402 of FIG. 4A in accordance with this second embodiment. Here, there is a pair of linear strips of non-magnetic material, interconnected linearly by a pair of magnetic strips. FIG. 4C is a perspective view of an assembled switchable magnetic filter 414 in accordance with this second embodiment in which the magnetic probe of FIG. 4A has been inserted within the housing assembly of FIG. 4B. The assembled switchable magnetic 414 filter of this second embodiment may also be mounted within a vessel 602 in which fluid is being pumped as shown in FIG. 6A.

Figure 5B:
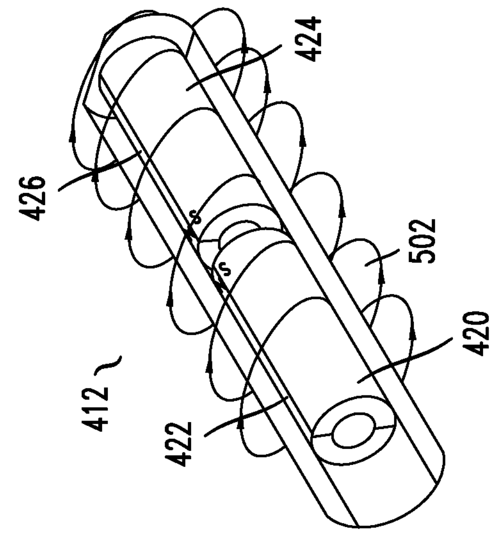
FIG. 5B is a perspective view of the rotatable magnetic probe of FIG. 4A rotated in the ON position as shown in FIG. 6A.
Figure 5A:
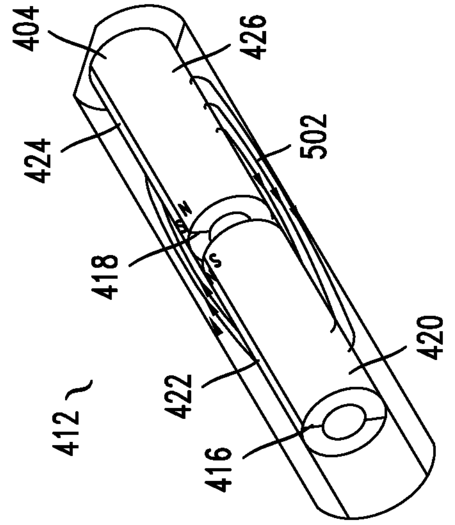
FIG. 5A is a perspective view of the rotatable magnetic probe of FIG. 4A rotated in the OFF position as shown in FIG. 6B and FIG. 6C.

In accordance with the second embodiment of the invention, and as shown in FIG. 5B, when the handle is rotated in the ON position, the shaft portion attached to the magnet 416 rotates with respect to the shaft portion attached to the magnet 418 (which may be fixed, e.g.) such that the magnets 416, 418 are in a position where the magnetic fields are aligned (i.e., north 422 aligned with north 426 and south 420 aligned with south 424). The resulting magnetic field 502 flows outside of the probe housing 412 (thus attracting the magnetic impurities in the fluid and retaining them against the outer wall of the housing 412). As shown in FIG. 5A, when rotated in the OFF position so that the shaft portion attached to the magnet 416 rotates with respect to the shaft portion attached to the magnet 418 such that the magnets 416, 418 are in a position where the magnetic fields are not aligned, i.e., they are opposite, shunting the magnetic field 502 internal to the probe housing 412. As with the first embodiment, this will release the ferrous impurities when cleaning/removal is performed.

Figure 6A:
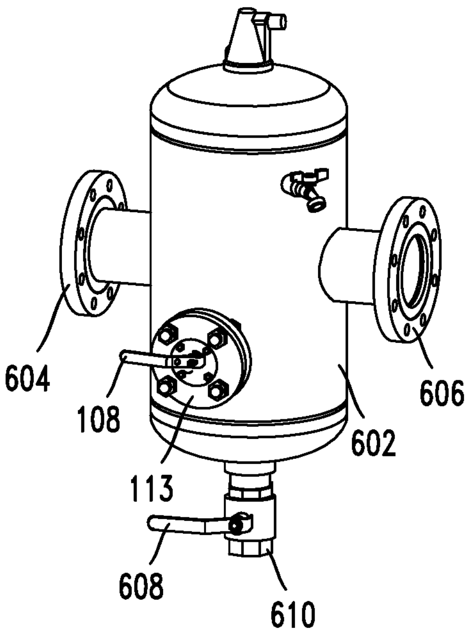
FIG. 6A is a perspective view illustration of the operation of the switchable magnetic filter of the present invention encased within a typical prior art vessel in which the magnetic assembly is in the ON position and the cleaning valve is in the CLOSED position.
Figure 6B:
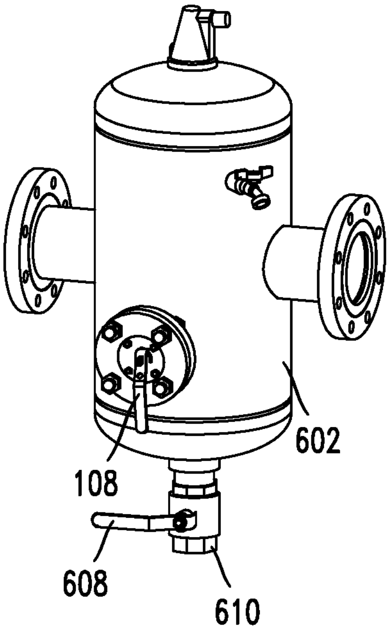
FIG. 6B is a perspective view illustration of the operation of the switchable magnetic filter of the present invention encased within a typical prior art vessel in which the magnetic assembly is in the OFF position and the cleaning valve is in the CLOSED position.

FIG. 6A is a perspective view illustration of the operation of the switchable magnetic filter 114, 414 encased within a typical prior art vessel 602 comprising ports 604, 606 through which fluid flows as known in the prior art. Here, the handle 108 is turned so that the magnetic filter is in the ON position, and the cleaning valve 608 is in the CLOSED position. In this modality, the magnetic field is formed in the region outside of the housing (within the vessel, not shown) so that magnetic impurities flowing in the fluid within the vessel may be attracted and retained against the outer portion of the housing as described above. At some point in time, is will be desired to perform maintenance of the system, and in particular to collect the metallic particles that have been captured by the switchable magnetic filter. To accomplish this, flow of the fluid is caused to temporarily stop (by separate means known in the art, not shown), and the handle 108 will be turned to the OFF position. FIG. 6B is a perspective view illustration of the operation of the switchable magnetic filter of either the first embodiment or the second embodiment in which the magnetic assembly has been turned to the OFF position and the cleaning valve 608 is in the CLOSED position. The magnetic particles collected by the magnetic filter will be released and drop towards the cleaning valve 608.

Figure 6C:
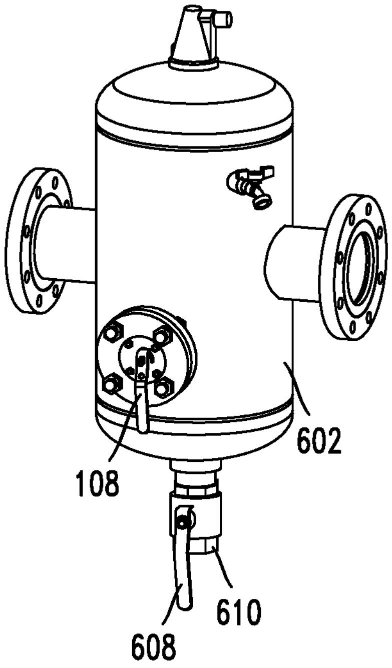
FIG. 6C is a perspective view illustration of the operation of the switchable magnetic filter of the present invention encased within a typical prior art vessel in which the magnetic assembly is in the OFF position and the cleaning valve is in the OPEN position.

FIG. 6C is a perspective view illustration in which the magnetic assembly is in the OFF position and the cleaning valve 608 is turned to the OPEN position so that the previously collected magnetic particles may be removed from the system through the port 610. After the particles are collected and removed, the handle 108 of the magnetic filter is returned to the ON position and the cleaning valve 608 is returned to the CLOSED position so the pumping system may continue to operate and collect magnetic particles within the vessel as described.

Linear Shifting Magnetic Probe

In accordance with a third embodiment of the invention, a magnetic probe is provided within a housing as in the first and second embodiments described above, but rather than rotating the probe inside the housing, the probe slides linearly towards and away from the housing in order to manipulate the magnetic field into an ON or OFF position.

Figures 7A, 7B, 7C, 7D:
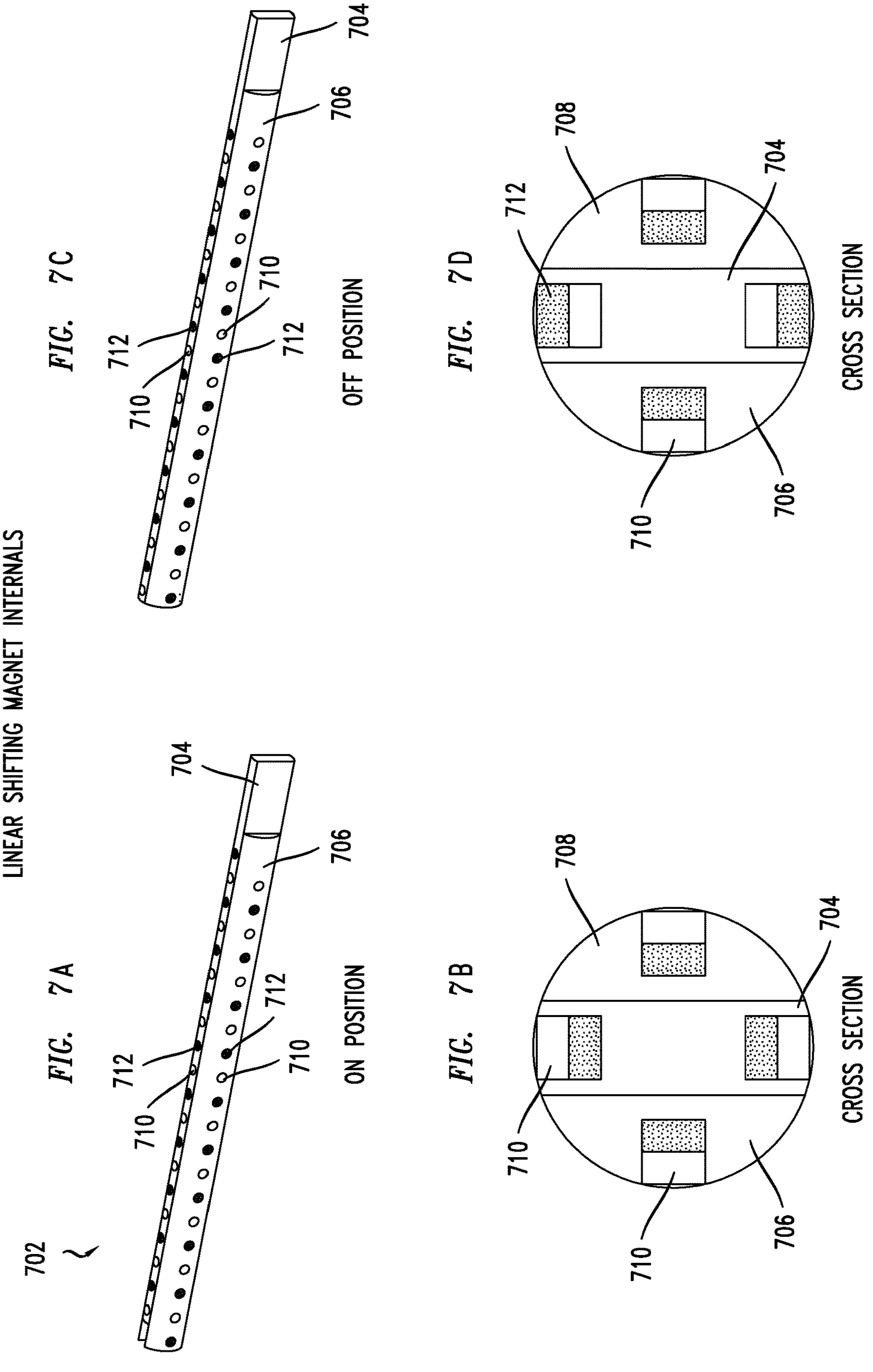
FIG. 7A is a perspective view of a slidable magnetic probe in an ON position in accordance with a third embodiment of the present invention.
FIG. 7B is a cross section view of the slidable magnetic probe of FIG. 7A
FIG. 7C perspective view of the slidable magnetic probe of FIG. 7A in an OFF position.
FIG. 7D is a cross section view of the slidable magnetic probe of FIG. 7C.

FIG. 7A is a perspective view of a slidable magnetic probe 702 in an ON position in accordance with this third embodiment of the present invention, and FIG. 7B is a cross section view of the magnetic probe of FIG. 7A. The probe 702 includes a pair of outer linear portions 706, 708 that surround an inner linear portion 704. The linear portions 704, 706, 708 include a plurality of north polarized magnets 710 and a plurality of south polarized magnets 712. As in FIG. 7A, four inline magnets of the same polarity around the circumference alternate touching different carbon rings to create a strong external magnetic field. In FIG. 7B, four magnets all with the same polarity are touching a single carbon steel ring.

As explained further below, when the inner liner portion 704 is slid with respect to the outer liner portions 706, 708 such that the north polarized magnets 710 are aligned with each other and the south polarized magnets 712 are aligned with each other, the probe is in the ON position. Moreover, when the inner linear portion 704 is slid with respect to the outer linear portions 706, 708 such that the north polarized magnets 710 are alternately aligned with the south polarized magnets 712, the probe is in the OFF position as shown in FIGS. 7C and 7D. In FIG. 7C, around the circumference the magnetic poles alternate keeping the magnetic field within the carbon rings thus nearly eliminating the external magnetic field. In FIG. 7D, half of the magnets are touching the carbon steel ring with one pole while the other half touch with the other pole.

Figures 8A, 8B, 8C:
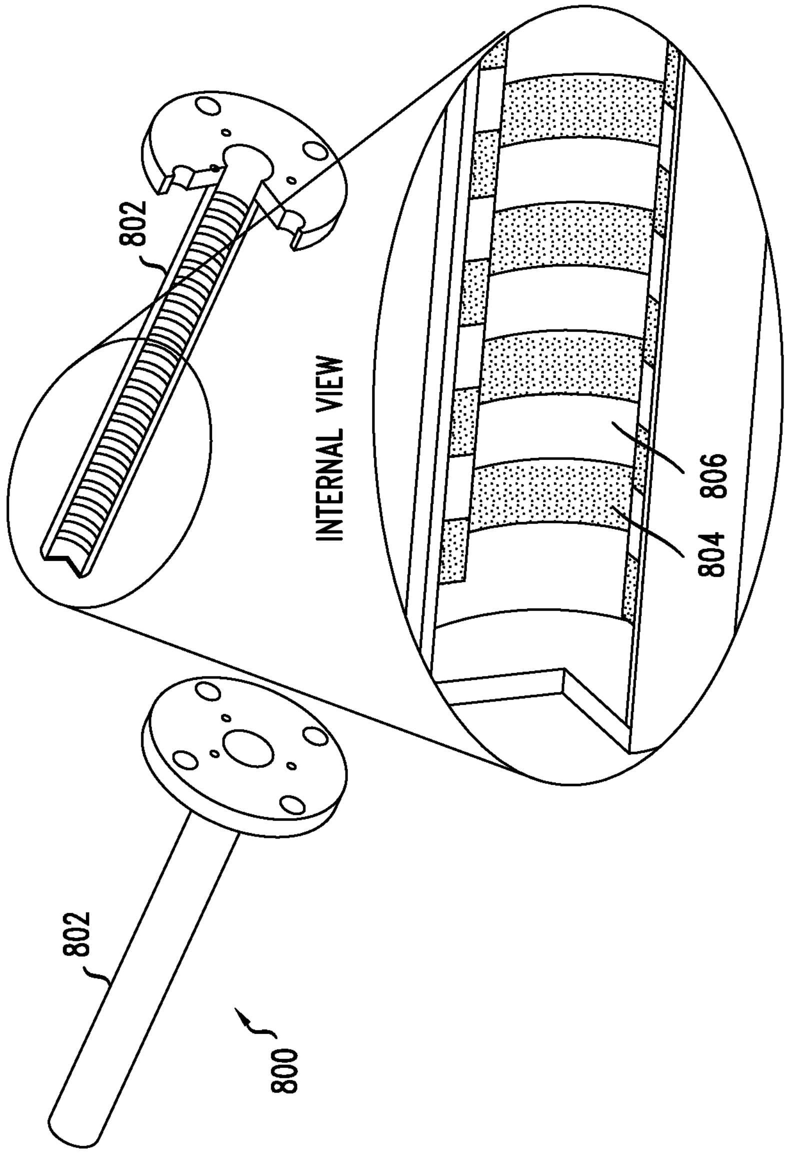
FIG. 8A is a perspective view of a housing assembly used to hold the slidable magnetic probe of FIG. 7A in accordance with the third embodiment of the present invention.
FIG. 8B is a cutaway view of the housing assembly of FIG. 8A.
FIG. 8C is a partial closeup of the cutaway view of the housing assembly of FIG. 8B.

FIG. 8A is a perspective view of a housing assembly 800 used to hold the slidable magnetic probe 702 of FIG. 7A in accordance with this third embodiment of the present invention, FIG. 8B is a cutaway view of the housing assembly 800 of FIG. 8A, and FIG. 8C is a partial closeup of the cutaway view of the housing assembly 800 of FIG. 8B. This housing assembly 800 will be a watertight non-magnetic sleeve 802, for example a stainless steel tube. As shown more closely in FIG. 8C, this will comprise alternating carbon steel (magnetic) rings 804 and stainless or aluminum (non-magnetic) spacer rings 806.

Figure 9A:
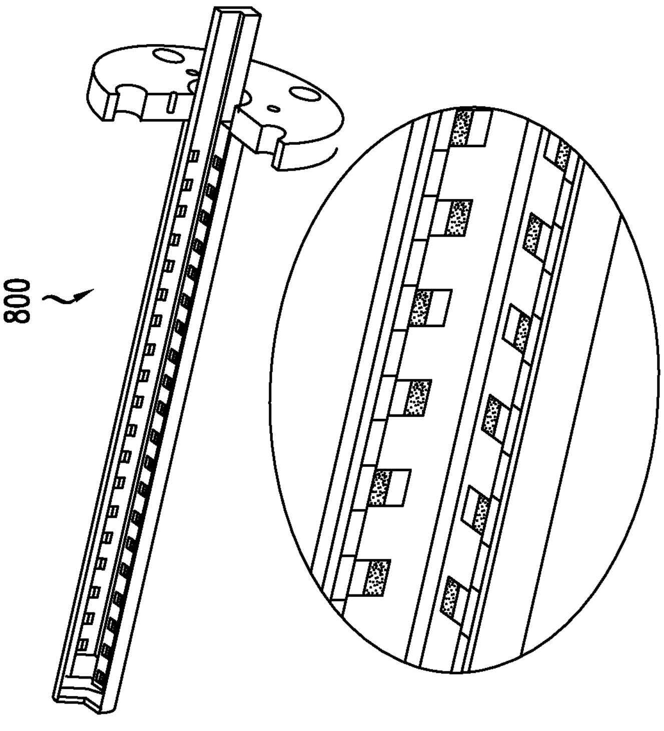
FIG. 9A is a perspective view of an assembled switchable magnetic filter in accordance with the third embodiment of the present invention, in the ON position.
Figure 9B:
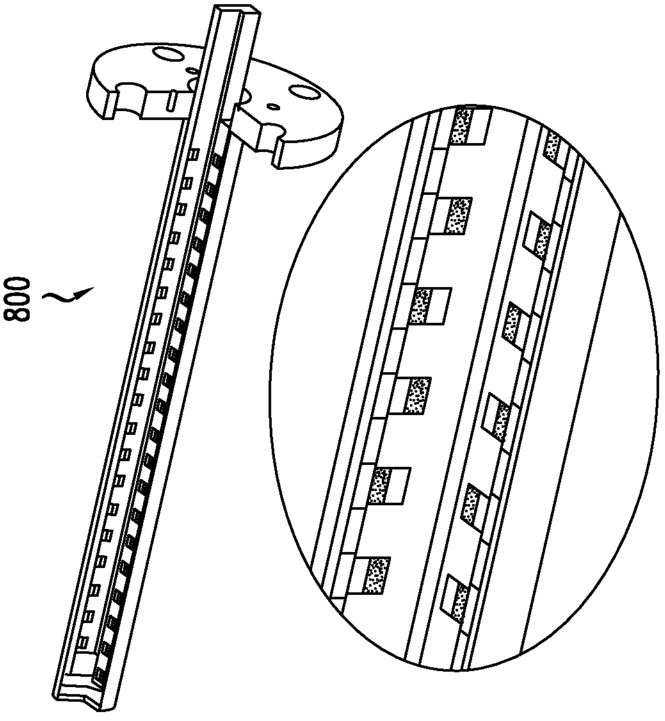
FIG. 9B is a perspective view of an assembled switchable magnetic filter in accordance with the third embodiment of the present invention, in the OFF position.

Reference is now made to FIG. 9A, which is a perspective view of an assembled switchable magnetic filter in accordance with this third embodiment in the ON position, and FIG. 9B is a perspective view of the assembled switchable magnetic filter in the OFF position. In the ON position, four inline magnets of the same polarity around the circumference alternate touching different carbon rings to create a strong external magnetic field. In the OFF position, around the circumference the magnetic poles alternate, keeping the magnetic field within the carbon ring thus nearly eliminating the external magnetic field.

This third embodiment may be utilized within a vessel 602 in a similar manner as described above with respect to the first and second rotatable embodiments, modified so that the probe housing may be slid back and forth to implement the ON and OFF positions as described above.

Other Fluid Filter Switchable Configurations

It is noted that alternative embodiments are envisioned in which other configurations may include variations of single or multiple magnets in an arrangement that allows the magnet to be activated to extend the magnetic field into the fluid to collect metallic/magnetic impurities and allow the magnetic field to be shunted internal to a probe or disc to for cleaning including Halbach arrays.

We claim:

1. A switchable magnetic filter comprising:

a housing assembly configured to be at least partially disposed within a vessel containing a fluid; and a magnetic probe rotatably disposed within the housing assembly, the magnetic probe comprising:

a shaft with a first end and a second end opposite the first end, and a magnetic assembly disposed at the second end, the magnetic assembly including at least one north magnet and at least one south magnet configured to create a north-south magnetic field, wherein the shaft is disposed within the housing assembly such that the first end extends out of the housing assembly and the shaft is configured to rotate within the housing assembly when the shaft is rotated between an ON position and an OFF position;

wherein, in the ON position, the at least one north magnet and the at least one south magnet are disposed such that the north-south magnetic field flows outside of the housing assembly, and wherein, in the OFF position, the at least one north magnet and the at least one south magnet are disposed such that the north-south magnetic field is shunted substantially within the housing assembly.

2. The switchable magnetic filter of claim 1 wherein the housing assembly comprises a probe housing formed from a first magnetic portion and a second magnetic portion each extending linearly along the probe housing and separated by a first non-magnetic portion and a second non-magnetic portion.

3. The switchable magnetic filter of claim 2 wherein the housing assembly further comprises a flange for mounting the housing assembly to a vessel.

4. The switchable magnetic filter of claim 1 wherein the magnetic assembly comprises a pair of oppositely disposed substantially semi-cylindrical magnetic portions comprising the at least one north magnet and the at least one south magnet.

5. The switchable magnetic filter of claim 2, wherein:

in the ON position, the at least one north magnet is substantially aligned with the first magnetic portion of the probe housing and the at least one south magnet is substantially aligned with the second magnetic portion of the probe housing; and in the OFF position, the at least one north magnet is substantially aligned with the first non-magnetic portion of the probe housing and the at least one south magnet is substantially aligned with the second non-magnetic portion of the probe housing.

* * * * *